(12) United States Patent
Jupin et al.

(10) Patent No.: US 11,315,277 B1
(45) Date of Patent: Apr. 26, 2022

(54) DEVICE TO DETERMINE USER-SPECIFIC HRTF BASED ON COMBINED GEOMETRIC DATA

(71) Applicant: Apple Inc., Cupertino, CA (US)

(72) Inventors: Peter Victor Jupin, Copenhagen (DK); Yacine Azmi, San Mateo, CA (US); Martin E. Johnson, Los Gatos, CA (US); Darius A. Satongar, Santa Clara, CA (US); Jonathan D. Sheaffer, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 267 days.

(21) Appl. No.: 16/560,171

(22) Filed: Sep. 4, 2019

Related U.S. Application Data

(60) Provisional application No. 62/737,751, filed on Sep. 27, 2018.

(51) Int. Cl.
*G06T 7/60* (2017.01)
*G06T 17/10* (2006.01)
(Continued)

(52) U.S. Cl.
CPC .............. *G06T 7/60* (2013.01); *G06T 17/10* (2013.01); *H04R 5/033* (2013.01); *H04R 5/04* (2013.01); *H04S 7/304* (2013.01); *G06T 2207/10048* (2013.01); *G06T 2207/30196* (2013.01); *H04S 2420/01* (2013.01)

(58) Field of Classification Search
CPC . G06T 7/60; G06T 17/10; G06T 2207/10048; G06T 2207/30196; H04S 7/304; H04S 2420/01; H04R 5/04; H04R 5/033
See application file for complete search history.

(56) References Cited

U.S. PATENT DOCUMENTS 6,188,776 B1 * 2/2001 Covell ............... G06K 9/00281
345/419
9,522,330 B2 12/2016 Pile et al.
(Continued)

FOREIGN PATENT DOCUMENTS

WO WO2017116308 A1 7/2017
WO WO2017158232 A1 9/2017

OTHER PUBLICATIONS

Alok Meshram—P-HRTF: Efficient personalized HRTF computation for high-fidelity spatial sound; IEEE International Symposium on Mixed and Augmented Reality (ISMAR) 2014; 9 Pages.

*Primary Examiner* — Christopher M Brandt
(74) *Attorney, Agent, or Firm* — Womble Bond Dickinson (US) LLP

(57) ABSTRACT

A device and a method of using the device to determine a user-specific head-related transfer function (HRTF), are described. The device can determine first geometric data corresponding to visible features of a pinna of a user in an image, and second geometric data corresponding to hidden features of the pinna obfuscated by the visible features in the image. The first geometric data and the second geometric data are combined in a geometric model that describes a shape of the pinna, and the user-specific HRTF is determined based on the geometric model. The user-specific HRTF is used to render spatial audio to the user. Other aspects are also described and claimed.

20 Claims, 7 Drawing Sheets

(51) Int. Cl.
*H04S 7/00* (2006.01)
*H04R 5/033* (2006.01)
*H04R 5/04* (2006.01)

(56) References Cited

U.S. PATENT DOCUMENTS

| | | | |
|---|---|---|---|
| 9,544,706 B1 * | 1/2017 | Hirst | H04S 7/302 |
| 9,892,133 B1 * | 2/2018 | Biessmann | G06N 20/00 |
| 9,900,722 B2 | 2/2018 | Bilinski et al. | |
| 9,955,279 B2 | 4/2018 | Riggs et al. | |
| 2006/0067548 A1 * | 3/2006 | Slaney | H04S 1/002 |
| | | | 381/303 |
| 2017/0272890 A1 | 9/2017 | Oh et al. | |
| 2019/0065823 A1 * | 2/2019 | Srivastava | G06K 9/00214 |

* cited by examiner

A - A

DEVICE TO DETERMINE USER-SPECIFIC HRTF BASED ON COMBINED GEOMETRIC DATA

This application claims the benefit of priority of U.S. Provisional Patent Application No. 62/737,751, filed on Sep. 27, 2018, and incorporates herein by reference that provisional patent application.

BACKGROUND

Field

Aspects related to devices having audio capabilities are disclosed. More particularly, aspects related to devices used to render spatial audio are disclosed.

Background Information

Spatial audio can be rendered using headphones that are worn by a user. For example, the headphones can reproduce a spatial audio signal that simulates a soundscape around the user. An effective spatial sound reproduction can render sounds such that the user perceives the sound as coming from a location within the soundscape external to the user's head, just as the user would experience the sound if encountered in the real world.

When a sound travels to a listener from a surrounding environment in the real world, the sound propagates along a direct path, e.g., through air to the listeners ear canal entrance, and along one or more indirect paths, e.g., by reflecting and diffracting around the listeners head or shoulders. As the sound travels along the indirect paths, artifacts can be introduced into the acoustic signal that the ear canal entrance receives. These artifacts are anatomy dependent, and accordingly, are user-specific. The user therefore perceives the artifacts as natural.

User-specific artifacts can be incorporated into binaural audio by signal processing algorithms that use spatial audio filters. For example, a head-related transfer function (HRTF) is a filter that contains all of the acoustic information required to describe how sound reflects or diffracts around a listener's head before entering their auditory system. An HRTF can be measured for a particular user in a laboratory. The HRTF can be applied to an audio input signal to shape the signal in such a way that reproductions of the shaped signal realistically simulates a sound traveling to the user from a surrounding environment. Accordingly, a listener can use simple stereo headphones to create the illusion of a sound source somewhere in a listening environment by applying the HRTF to the audio input signal.

SUMMARY

Existing methods of generating head-related transfer functions (HRTFs) are time-consuming or impractical to perform on a user-by-user basis, and can result in incomplete HRTF information. For example, direct physical measurements of a pinna can be expensive because the measurements may require special instruments to be used in a laboratory setting. Although imagery tools can be used to indirectly measure the pinna, the imagery may require calibration based on measurement standards, which can complicate the process. Furthermore, measurements of the pinna using imagery may not include measurements of hidden features of the pinna that are not visible in the imagery, and therefore, the resulting HRTF information may be incomplete.

A device and a method of using the device to determine an HRTF for a user, are described. By applying the user-specific HRTF to an audio input signal, a spatial audio signal can be generated and played for the user. When reproduced, the spatial audio signal can accurately render a spatial sound to the user.

The method of using the device to determine the user-specific HRTF can include receiving an image that includes visible features of a pinna of a user. The visible features can obfuscate hidden features of the pinna in the image. First geometric data representing the visible features can be determined from the image. For example, the image can be captured by a structured-light scanner that is factory-calibrated, and thus, accurate measurements of visible features of the pinna can be made in three dimensions directly from the image. Second geometric data representing the hidden features can be determined based on the first geometric data. For example, a reference database containing physical measurements of both visible and hidden features of others can be used to determine dimensional values of the hidden features. The first geometric data can be correlated to data within the reference database that corresponds to the hidden features of the user. More particularly, an expected value of the hidden feature can be determined by calculating a conditional mean of a hidden feature based on the reference data representing features of the other reference pinnas. The first and second geometric data can be combined, e.g., in a latent variable model, to generate geometric models of the pinnas and head of the user. The geometric models can then be used to determine a user-specific HRTF of the user. The user-specific HRTF can be selected from a database of previously determined HRTFs for users having similar anatomical characteristics, or the user-specific HRTF can be generated by numerical modeling. The user-specific HRTF can be applied to an audio input signal, e.g., a recording, to generate a spatial input signal that can be reproduced by a speaker in order to accurately render spatial audio to the user.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

DETAILED DESCRIPTION

Figure 1:
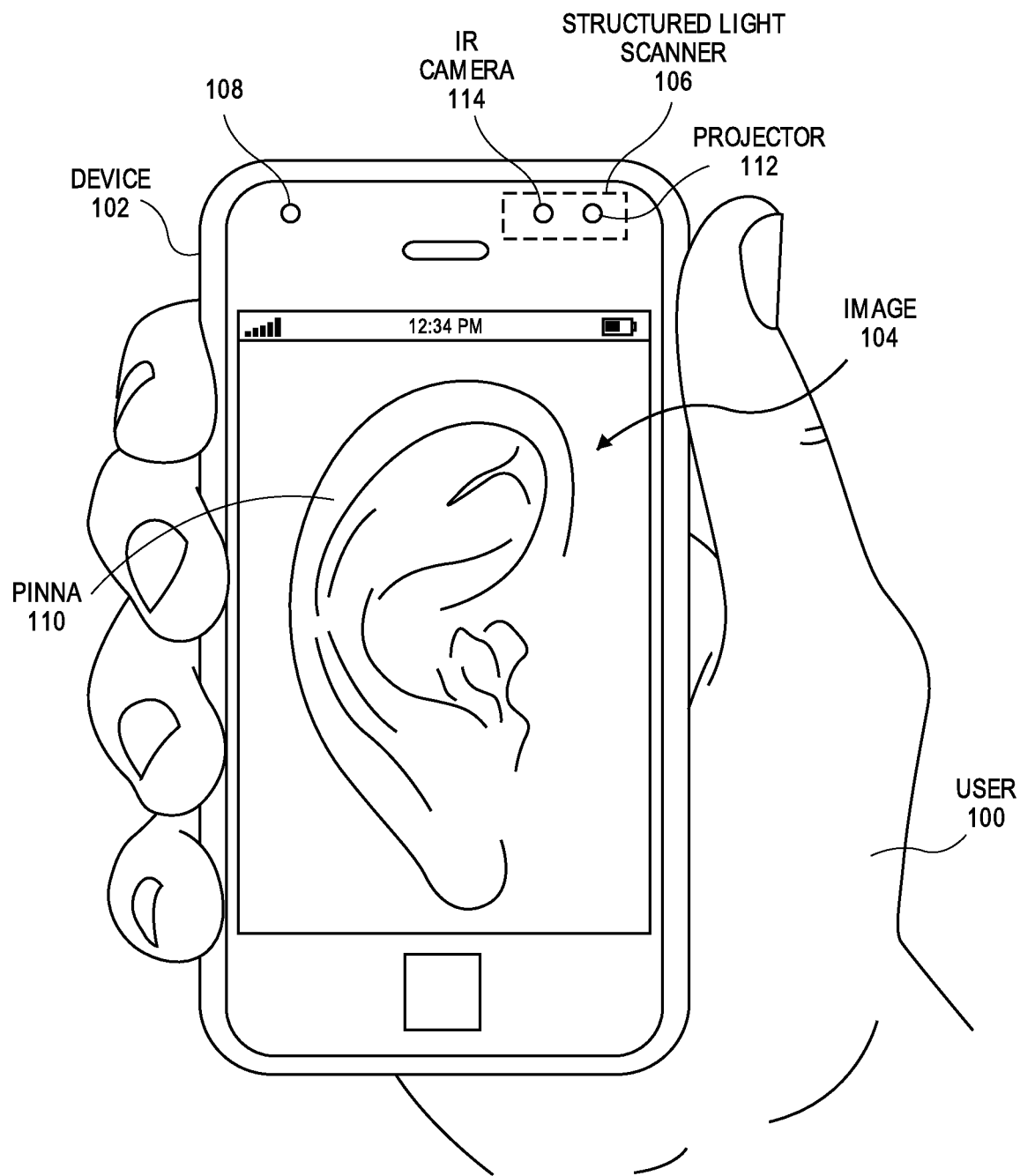
FIG. 1 is a pictorial view of a displayed image of a pinna of a user, in accordance with an aspect.

Aspects describe a device and a method of using the device to determine a user-specific head-related transfer function (HRTF) for a user. The device can be a mobile device, such as a smartphone, and can apply the user-specific HRTF to an audio input signal to generate a spatial input signal for a pair of headphones. For example, the headphones can be circumaural headphones. The device, however, can be another device for rendering audio to the user, such as desktop computer, laptop computers, etc., and the headphones can include other types of headphones, such as earbuds or a headset, to name only a few possible applications.

In various aspects, description is made with reference to the figures. However, certain aspects may be practiced without one or more of these specific details, or in combination with other known methods and configurations. In the following description, numerous specific details are set forth, such as specific configurations, dimensions, and processes, in order to provide a thorough understanding of the aspects. In other instances, well-known processes and manufacturing techniques have not been described in particular detail in order to not unnecessarily obscure the description. Reference throughout this specification to "one aspect," "an aspect," or the like, means that a particular feature, structure, configuration, or characteristic described is included in at least one aspect. Thus, the appearance of the phrase "one aspect," "an aspect," or the like, in various places throughout this specification are not necessarily referring to the same aspect. Furthermore, the particular features, structures, configurations, or characteristics may be combined in any suitable manner in one or more aspects.

The use of relative terms throughout the description may denote a relative position or direction. For example, "in front of" may indicate a first direction away from a reference point. Similarly, "behind" may indicate a location in a second direction away from the reference point and opposite to the first direction. Such terms are provided to establish relative frames of reference, however, and are not intended to limit the use or orientation of a device to a specific configuration described in the various aspects below.

In an aspect, a device is used to generate a personalized HRTF for a user. The HRTF can be selected or modeled based on a geometric model that is generated using a combination of image-derived geometric data. For example, an image of a pinna of the user can be used to determine first geometric data representing features of the pinna that are visible in the image. The first geometric data can be used to determine second geometric data representing features of the pinna that are hidden in the image. For example, the hidden features may be obfuscated by the visible features in the image. The determined first geometric data and second geometric data can be combined, e.g., in a latent variable model, to generate the geometric model that represents a shape of the pinna. The geometric model can then be used to derive the HRTF that is specific to the pinna of the user.

Since the HRTF is specific to the pinna and the pinna is unique to the user, the HRTF is user-specific. Accordingly, the user-specific HRTF can be applied to an audio input signal to generate a spatial input signal that accurately renders spatial audio to the user.

Referring to FIG. 1, a pictorial view of an image of a pinna being displayed by a device is shown in accordance with an aspect. A user 100 can hold a device 102, e.g., a mobile device, to scan or otherwise capture one or more images 104 of one or more anatomical features. For example, device 102 can include a structured-light scanner 106 and/or a multispectral camera 108 to capture image 104 of a pinna 110 of user 100.

In an aspect, structured-light scanner 106 can include a projector 112 and an infrared camera 114. Scanner can project an infrared light pattern onto pinna 110, and camera can capture image 104 of the infrared light pattern projected onto pinna 110. For example, the infrared light pattern may include a grid of dots projected onto pinna 110, and image 104 can capture reflections of the dots. The projected grid can have a predetermined spacing between dots. The dots, however, will land on the contour of pinna 110 such that the spacing between dots as imaged may change. The contour can accordingly be modeled based on the imaged dot spacing.

Figure 2:
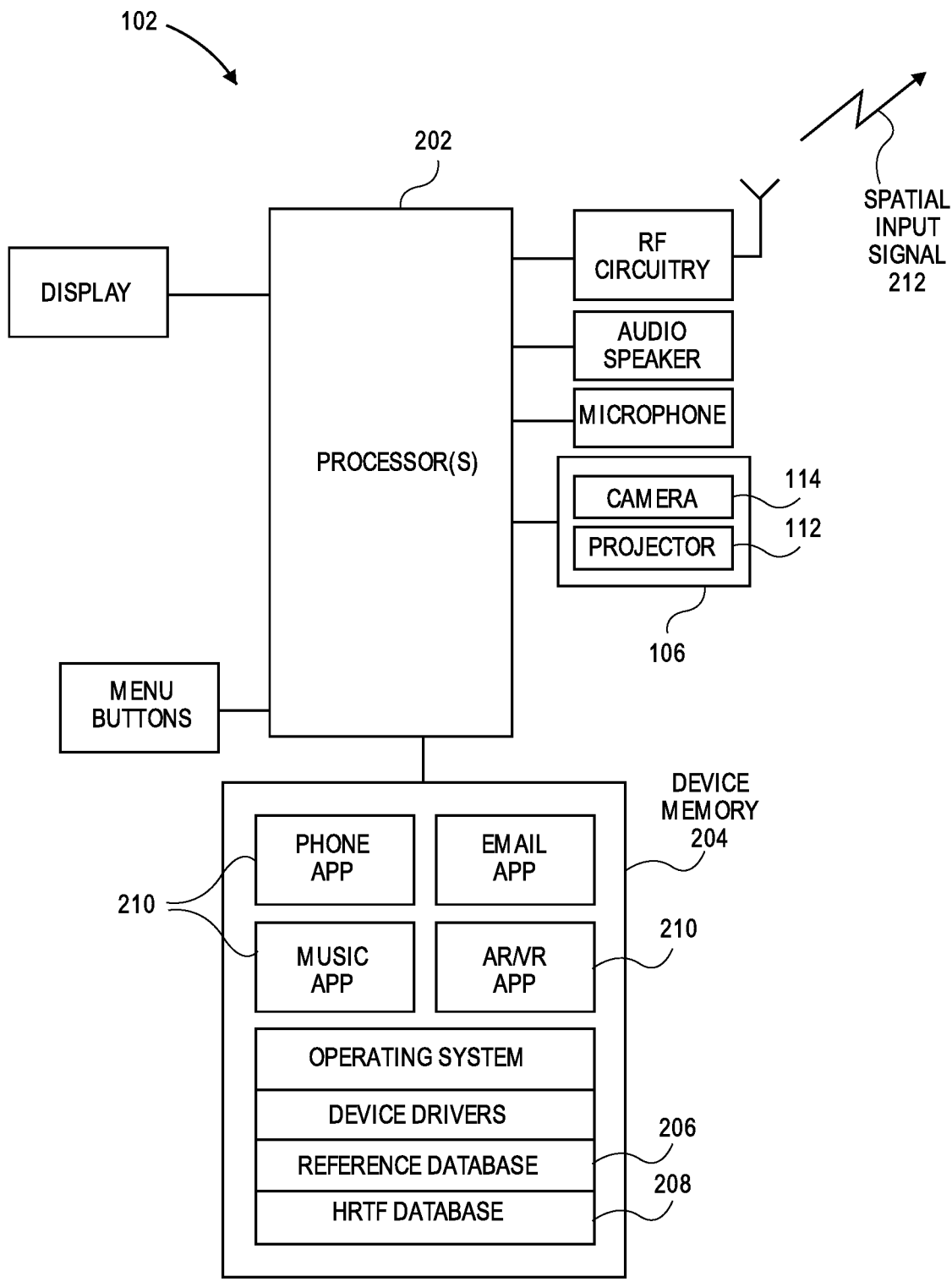
FIG. 2 is a block diagram of a device, in accordance with an aspect.

Referring to FIG. 2, a block diagram of a device is shown in accordance with an aspect. Device 102 can include circuitry suited to specific functionality. Furthermore, the circuitry and/or functionality may be distributed in a system that includes device 102 and at least one other device. For example, processors or memory components as described below may be implemented in a pair of headphones that connect to device 102 to render spatial audio. Accordingly, the diagrammed circuitry and corresponding functionality is described below by way of example, and not by way of limitation.

The system may include one or more processors to execute instructions to carry out the different functions and capabilities described below. For example, instructions executed by device processor(s) 202 of device 102 may be retrieved from a device memory 204, which may include a non-transitory machine-readable medium. The instructions may be in the form of an operating system program having device drivers and/or an audio rendering engine for rendering spatial audio playback.

Device processor(s) 202 may directly or indirectly implement control loops and receive input signals from and/or provide output signals to other electronic components. For example, device 102 may receive input signals from microphone(s) or menu buttons of device 102, including through input selections of user interface elements displayed on a display. A scanning device, such as a structured-light scanner 106, can capture image(s) 104. Processor(s) 202 can receive the image(s) for further processing.

Device processor(s) 202 can retrieve HRTF processing data from device memory 204. For example, the captured image(s) 104 can be stored in device memory 204 and retrieved for further processing to determine an HRTF, as described below. The HRTF determination can also leverage reference data stored in a reference database 206 in device memory 204. Similarly, the HRTF determination can leverage predetermined HRTFs that are stored in an HRTF database 208.

Audio data associated with one or more audio sources 210 may also be stored in device memory 204. The audio sources 210 can include phone and/or music playback functions controlled by the telephony or music application programs that run on top of the operating system. Similarly, audio data may be associated with an augmented reality (AR) or virtual reality (VR) application program that runs on top of the operating system. The audio data can include an audio input signal, e.g., a non-spatialized input signal, corresponding to a user content signal such as a voice recording or a music recording.

Device processor(s) 202 can apply an HRTF for user 100 to the audio input signal to generate a spatial input signal 212 for playback by one or more speakers of a connected device. More particularly, device 102 and the connected device can communicate spatial input signal 212 wirelessly via respective RF circuitry, or through a wired connection. By way of example, device 102 can communicate spatial input signal 212 (e.g., a spatialized user content signal) provided by the AR/VR application programs, to one or more speakers of a connected pair of headphones worn by user 100. The headphones can render spatial audio playback to user 100.

Figure 3:
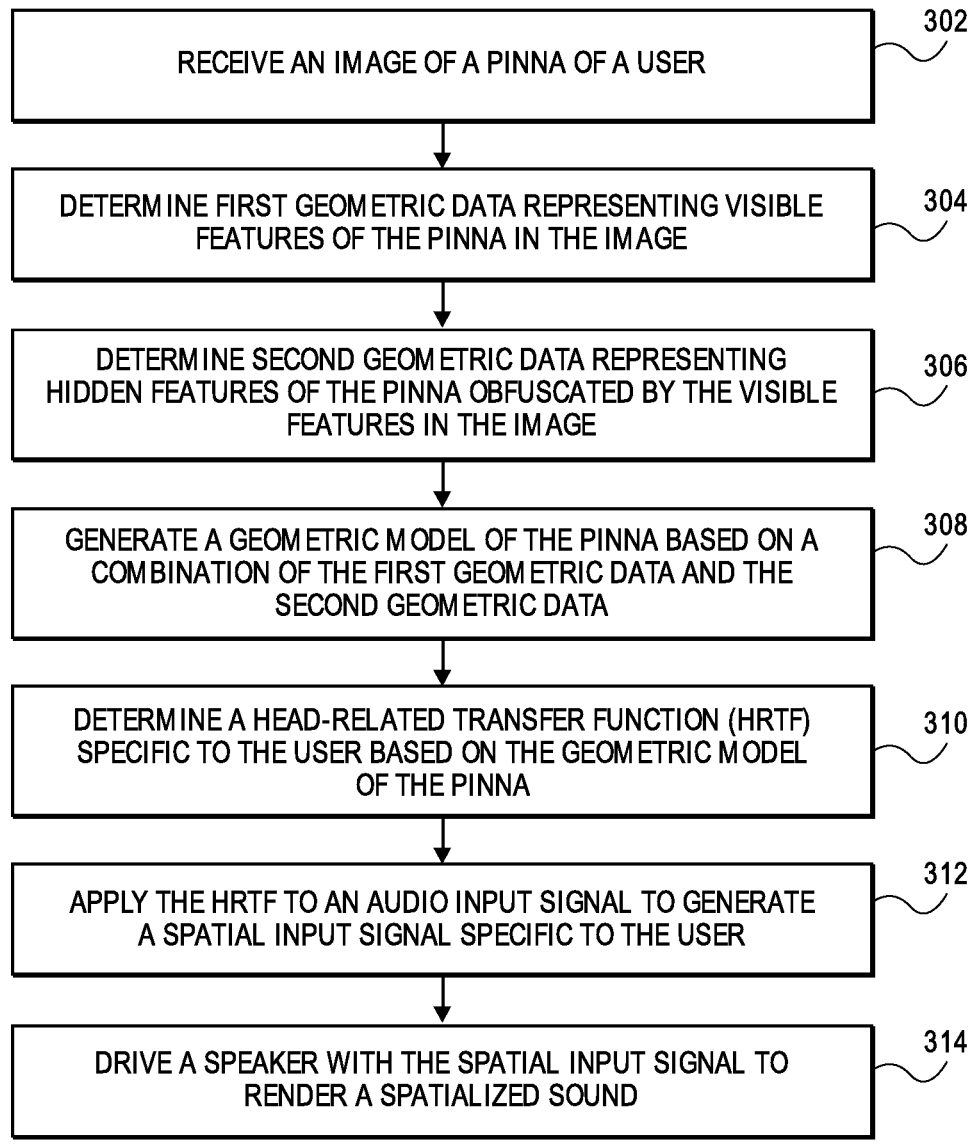
FIG. 3 is a flowchart of a method of determining a user-specific head-related transfer function (HRTF), in accordance with an aspect.

Referring to FIG. 3, a flowchart of a method of determining a user-specific HRTF is shown in accordance with an aspect. The operations of the method of FIG. 3 relate to aspects shown in FIGS. 4-8, and accordingly, FIGS. 3-8 are described in combination below.

At operation 302, an image 104 of pinna 110 of user 100 is received. Images 104 of pinna 110 can be captured by device 102 while user 100 holds the device at different vantage points. For example, device 102 can be held to the left of user 100 to capture a left image 104A of a left ear of user 100. Device 102 can be held to the right of user 100 to capture a right image 104B of the right ear of user 100. Additionally, device 102 can be held in front of user 100 to capture a front image 104C of a face profile of user 100. All of the images can be consecutively captured still images or frames of a video as user 100 sweeps the device in an arc around an azimuth of the user's head.

User 100 can capture image(s) 104 in any of several enrollment schemes to gather the imagery that is needed for the rest of the HRTF generation process described below. In an aspect, user 100 holds device 102 at the different vantage points as part of an initial enrollment scheme. For example, user 100 can access an HRTF generation application, and the application can prompt user 100 to hold device 102 in the various locations to capture the images. Imagery can also be captured as part of a window of opportunity scheme. For example, whenever user 100 holds device 102 up to image the head or ear of user 100, e.g., during a videoconference or a phone call, device 102 can capture images 104 in response to detecting the movement and/or the anatomy of interest, e.g., the ear of user 100.

Each of the captured images 104 can include respective features of the user anatomy. For example, left image 104A can include visible features of a left pinna of user 100, and right image 104B can include visible features of a right pinna of user 100. The front image 104C can include visible features of the face of user 100 and/or the ears of user 100 in the context of the face. More particularly, a position of the ears relative to each other and relative to other anatomical structures, e.g., a nose of user 100, can be seen in front image 104C. As described below, processor(s) 202 can receive the images 104 and determine anatomical data of the user based on image data included in the captured images 104.

Figure 4:
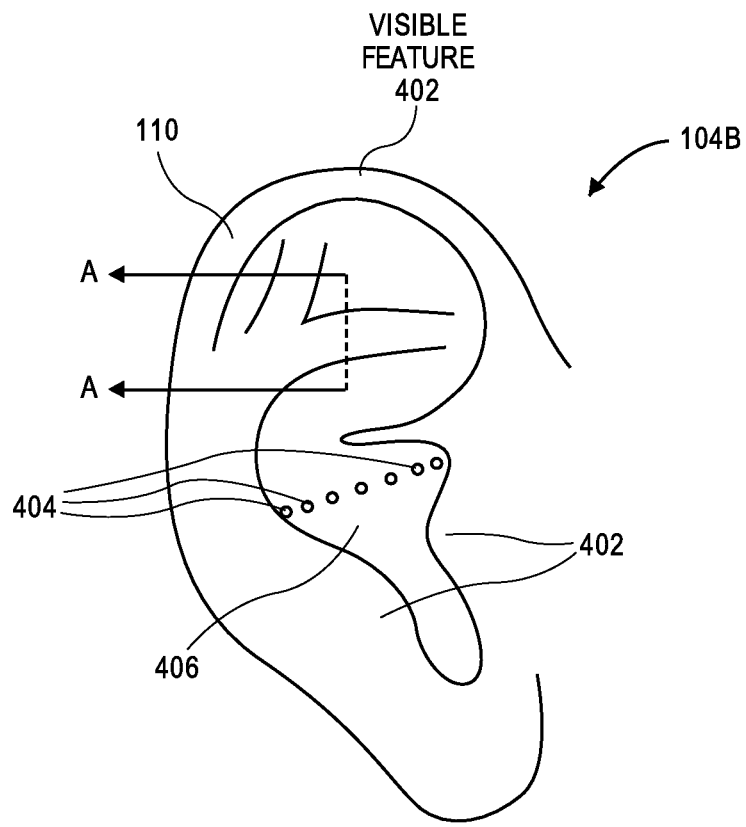
FIG. 4 is a pictorial view of an image of a pinna having visible features, in accordance with an aspect.

Referring to FIG. 4, a pictorial view of an image of a pinna having visible features is shown in accordance with an aspect. Images 104 captured by device 102 can include two-dimensional images captured by multispectral camera 108. For example, multispectral camera 108 can be a visible spectrum (RGB) camera, e.g., a stereo RGB camera. Images 104 may be three-dimensional images captured by structured-light scanner 106. The image(s) 104 can include visible features. For example, image 104, e.g., right image 104B, of pinna 110 of user 100 can include visible features 402, such as a helix, a tragus, and an antitragus of pinna 110, to name a few possible visible features. Each of the visible features 402 may be seen in the captured image.

In an aspect, projector 112 of structured-light scanner 106 can project an infrared light pattern 404 onto pinna 110, which can be imaged by one or more cameras of device 102. Infrared camera 114 of structured-light scanner 106 can capture image 104, e.g., right image 104B, of infrared light pattern 404. A single line of dots is shown in FIG. 4 traversing a concha 406 of the ear. The light pattern may, however, be a grid pattern covering the entire ear. The reflected dots of infrared light pattern 404 represent a contour pinna 110, and correspond to dimensions of pinna features. For example, the closely spaced dots at the ends of the single line of dots denote a concave contour of concha 406. Similarly, a distance between a pair of infrared light pattern dots on opposite ends of the single line of dots corresponds to a width of concha 406.

It will be appreciated that visible features of the pinnas, torso, and head of user 100 can include features that are partially obfuscated by hair or soft tissue. For example, the pinna may be hidden behind a lock of hair, and thus, may not be seen by a bystander. Device 102 may nonetheless capture data described the features using other sensors, such as a time of flight camera, that can penetrate the hair or soft tissue to detect the Cartesian coordinates of the partially obfuscated features.

Figure 5:
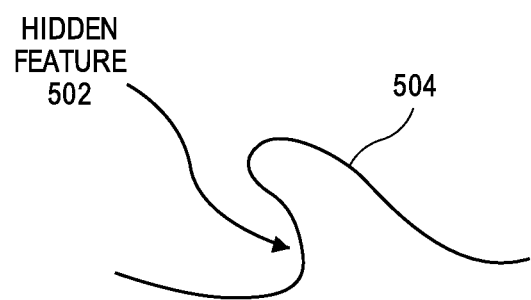
FIG. 5 is a cross-sectional view, taken about line A-A of FIG. 4, of a hidden feature of a pinna of a user, in accordance with an aspect.

Referring to FIG. 5, a sectional view, taken about line A-A of FIG. 4, of a hidden feature of a pinna of a user is shown in accordance with an aspect. In addition to visible features 402 seen in image 104, pinna 110 can include one or more hidden features 502. Hidden features 502 can be obfuscated by visible features 402 in image 104. For example, pinna 110 of user 100 can include a triangular fossa 504 that curls over to hide an internal cavity. That is, infrared light pattern 404 projected onto pinna 110 may not reach the internal cavity. For this reason, triangular fossa 504 is a region of pinna 110 that is particularly difficult to measure using imagery. More particularly, since infrared light pattern 404 cannot reach hidden features 502, the hidden features cannot be measured directly from the image 104. Nonetheless, hidden features 502 are crucial geometries in terms of developing a plausible HRTF for user 100. Accordingly, a user-specific HRTF for user 100 should represent acoustical artifacts introduced by both visible features 402 and hidden feature 502 of pinna 110. As described below, hidden feature data that is not available from images 104 can be determined based on visible feature data that is available.

Referring again to FIG. 4, at operation 304, first geometric data representing visible features 402 is determined by device processor(s) 202 based on image 104. The captured images 104, e.g., images of a left ear, right ear, and/or head or torso of user 100, can be used to generate a data set, e.g., a point cloud or an augmented point cloud, of the respective geometry. More particularly, image processing can be performed on images 104 captured by a camera of device 102 to determine a set of data points in space that represent visible features 402. The point cloud can include one or more points representing the contour of pinna 110 of user 100. The pointes can include Cartesian (x, y, z) coordinates of the one or more points in space. The augmented point cloud can include richer data types, e.g., in addition to the Cartesian coordinates of the one or more points. For example, each point can include one or more additional dimensions in addition to the Cartesian coordinates. The additional dimensions can include orientation information, e.g., a unit normal vector for the point. Other types of data that can be included for each point include: curvature information such as principle curvature or Gaussian curvature at the point, or confidence information such as estimates of variance derived from the measured process or from statistical modeling.

Notably, images 104 that are used to generate the data set can be one or more of images 104 captured by multispectral camera 108 and/or one or more images 104 captured by infrared camera 114. For example, multispectral camera 108 can capture several images 104 that may be processed using photogrammetry to generate a mesh representing a contour of pinna 110. Similarly, device 102 can include a depth camera, such as structured-light scanner 106, that captures images 104 useful for determining depths of the contour of pinna 110. Accordingly, the mesh generated based on multispectral camera images can be combined with the depths generated based on the depth camera, and the combined data can form a point cloud representing the pinna shape.

In an aspect, first geometric data is determined based on point cloud. For example, first geometric data can include direct measurements of spacing between reflected dots of infrared light pattern 404. Spacing between the reflected dots across the pinna contour, e.g., dots extending across concha 406 in FIG. 4, can be directly measured. The measured spacing may differ from a spacing of the dots as projected, and accordingly, a depth and/or contour of visible features 402 of pinna 110 can be determined. The measurements can be used as first geometric data representing the visible features 402. For example, a visible feature 402 may be a width or a depth of concha 406. Other features of pinna 110 can be measured as first geometric data. For example, a depth of the inferior crus of antihelix or a length of the cavum can be directly measured, in addition to other visible features 402.

In an aspect, structured-light scanner 106 of device 102 is a factory-calibrated system that can accurately measure infrared light pattern 404 without reference to a measurement system. More particularly, structured-light scanner 106 can be pre-calibrated, e.g., before capturing images 104, such that the first geometric data includes measurements of the infrared light pattern 404 taken directly from images 104. Accurate scaling or sizing of the pinna features is crucial to determining a user-specific HRTF because the pinna shape affects the impulse response of the outer ear. An inaccurate measurement of the pinna shape can result in minor errors in the HRTF that substantially affect how user 100 perceives the output sound. Existing systems that use imagery to determine pinna shape may require that captured images be sized relative to a known measurement standard, e.g., a ruler, or that the captured images be scaled to match a predetermined pinna size. These after-the-fact operations can be time consuming and may even result in shape distortions in the measured image that introduces error into the HRTF. Advantageously, pre-calibrated structured-light scanner 106 does not require after-the-fact scaling of images 104 and does not involve fitting the images 104 to predetermined pinna standards. Accordingly, the factory calibrated structured-light scanner of device 102 can increase a speed and accuracy of pinna measurements.

Figure 6:
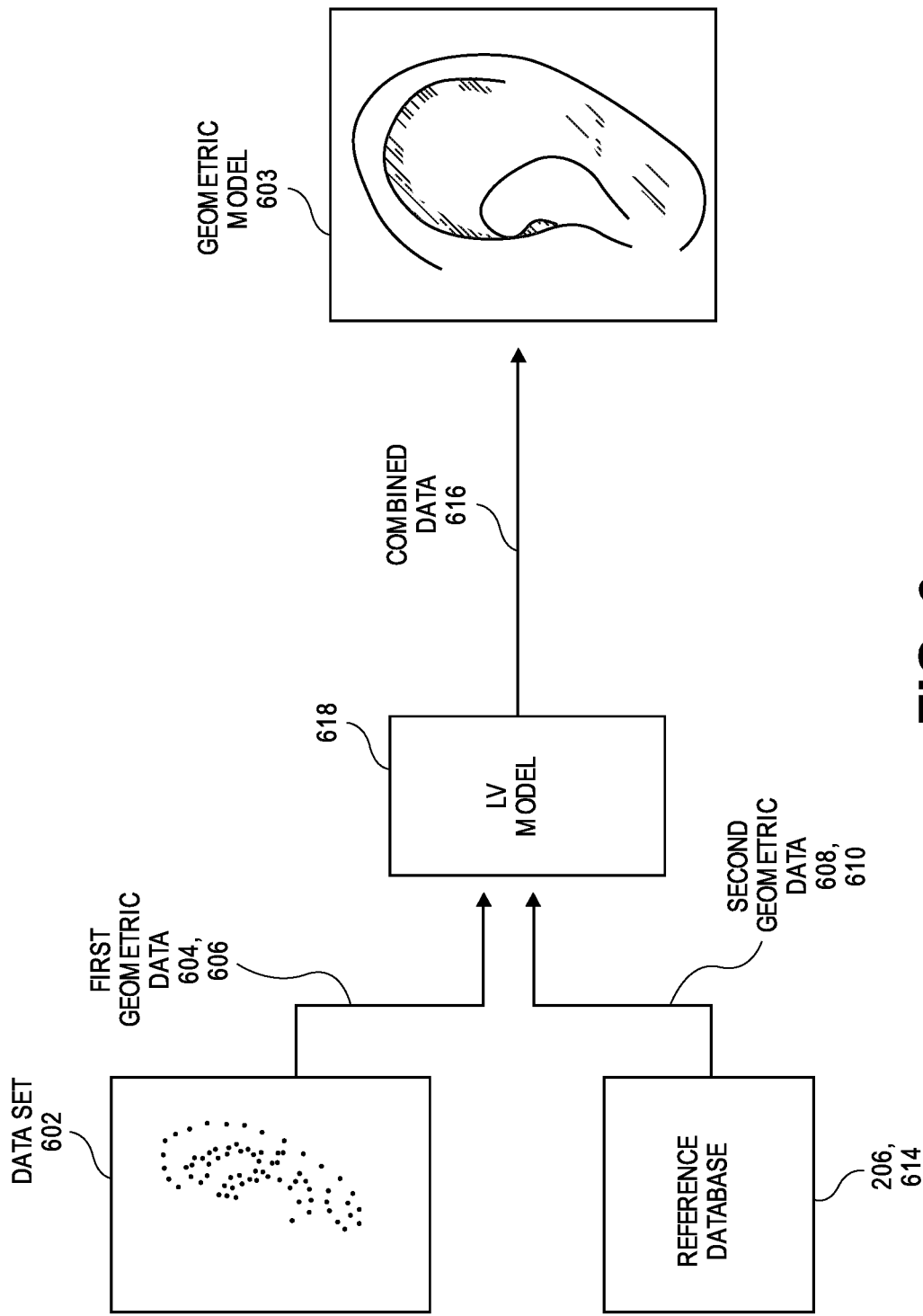
FIG. 6 is a pictorial view of operations of a method of determining a geometric model of a pinna, in accordance with an aspect.

Referring to FIG. 6, a pictorial view of operations of a method of determining a geometric model of a pinna is shown in accordance with an aspect. Data set 602, e.g., a point cloud, measured directly from image 104 can include a sparse set of data that does not fully describe the pinna geometry. Therefore, any geometric model 603 representing a shape of pinna 110, which is derived from data set 602, may be missing information about the pinna shape in certain regions. For example, first geometric data 604 can include measurement values 606 taken directly from images 104 and corresponding to visible features 402 of pinna 110, but no such measurements may be made for hidden features 502 that are obfuscated in the image 104. Therefore, to accurately model pinna 110, it may be necessary to fill in the gaps of the missing pinna information with accurate approximations of expected measurements of hidden features 502.

At operation 306, device processor(s) 202 determine second geometric data 608 representing hidden features 502 of pinna 110. Second geometric data 608 can include expected values 610 of hidden features 502 based on the determined first geometric data 604. Expected values 610 can be estimated by statistically correlating measurement values 606 of first geometric data 604 to data values stored within a reference database 206. Reference database 206 can include predetermined measurement values of the ear, head, and torso geometry of several other users. Accordingly, the measurement values taken from other users can be used to fill the gaps in the measurement values of user. That is, the measurement values of other users can be relied upon to estimate measurements for hidden features 502 of pinna 110.

In an aspect, reference database 206 includes reference data 614 representing features of several reference pinnas. The reference pinnas can be pinnas of other users and/or persons in general. More particularly, the pinnas of hundreds, thousands, or more people can be measured to generate reference database 206 having a large set of anatomical information for other users. The reference data 614 can include measurements of both visible features 402 and hidden features 502 of each of the reference pinnas. More particularly, the features of the reference pinnas can be measured directly using physical measurement techniques that do not rely on imagery. Accordingly, the hidden features 502, e.g., those features that would be hidden in an image, can be measured for other users using physical measurement techniques. Accordingly, reference database 206 includes a complete set of measurement values of the pinna features.

Expected values 610 of hidden features 502 of user 100 can be estimated by determining a statistical correlation between visible features 402 of user 100 and corresponding features of the reference pinnas. The features of the reference pinnas can represent a mean ear shape and the most important modes of variation in a population. By observing a sparse set of observations, e.g., data set 602, a conditional mean of hidden features 502 can be computed based on the condition of visible features 402 that are observed. More particularly, a conditional mean of hidden feature 502 can be determined using reference data 614 by determining an expectation of hidden feature 502 conditional on visible features 402 having the directly measured values. The conditional means of the hidden features 502 can then be used as expected values 610 of second geometric data 608 to fill in the gaps in first geometric data 604. This combined set of geometric data can provide a complete anatomical shape, e.g., a complete pinna shape, based on observable and correlated features.

An example of determining a conditional mean of a hidden feature is provided here by way of example and not limitation. Furthermore, it shall be appreciated that adjustments to the described methodology may be made that are contemplated as being within the scope of this description. In an aspect, an expected value of a height of triangular fossa 504 (hidden feature 502) is determined based on the condition of observed widths of the conchas of other users. For example, all users having a concha width that is equal to, or within a predetermined tolerance of, the width of concha 406 of user 100 as measured directly from image 104 can be selected. Measured fossa heights of the selected users can then be determined and averaged. The mean value of fossa heights is an expected value of the fossa height conditioned on the concha width being similar to the measured width of concha 406 of user 100. Accordingly, the conditional mean of fossa height for the other users can be used as an expected value of hidden feature 502 for user 100.

At operation 308, device processor(s) 202 generate geometric model 603 of pinna 110 based on a combination of first geometric data 604 and second geometric data 608. The geometric data can be input to a latent variable (LV) model. For example, the LV model can be a principal component analysis (PCA) model or any other dimensionality reduction algorithm. A PCA model has been shown to be useful in the aspects described herein, however, other LV models such as a neural network model can be used. First geometric data 604 and second geometric data 608 can be combined in LV model 618 to help reduce the number of variables needed to generate or select an HRTF to a manageable level. LV model 618 can be for an ear, head, and torso of user 100. In an aspect, LV model 618 can reduce the variable set to eighty variables for each ear of user 100, and fifty variables for the head of user 100. The variables include measurement values 606 of first geometric data 604 and expected values 610 of second geometric data 608. The values for features that impact an HRTF of user 100 are output by LV model 618 to generate geometric model 603.

Geometric model 603 can be a submesh representing a shape of an anatomical portion, e.g., pinna 110. In an aspect, geometric model 603 represents visible features 402 as measured directly from image 104, and hidden features 502 statistically determined using the reference database 206. Geometric model 603 is therefore an accurate anatomical representation of anatomical shapes of user 100.

The above description has focused primarily on generating geometric model 603 for pinna 110 of user 100, however, it will be appreciated that geometric models 603 of user 100 can include submeshes for both pinnas 110 of user 100, and a submesh for the head of user 100. The submeshes can include dimensional values that correspond to HRTF parameters directly or indirectly. For example, the submesh of the head of user 100 may include dimensional values, e.g., a width of the head, that directly corresponds to an interaural time difference (ITD) parameter of the HRTF of user 100. The ITD corresponds to a difference in arrival time of sounds at the left ear and the right ear of user 100. The ITD parameter can be decoupled from, and applied to, a spectral shaping component of the HRTF that plots signal frequency against relative angle in terms of signal amplitude. By contrast, the submesh of pinna structures may include dimensional values of triangular fossa 504 that are not measurable from image 104, but which impact the impulse response of the ear. The triangular fossa measurement may be one of several variables that must be combined to determine the spectral shaping component of the HRTF, and cannot be decoupled as from the other HRTF parameters. Given that all of the dimensional values of geometric model provide user-specific information that the HRTF of user 100 is based on, the HRTF is user-specific.

Figure 7:
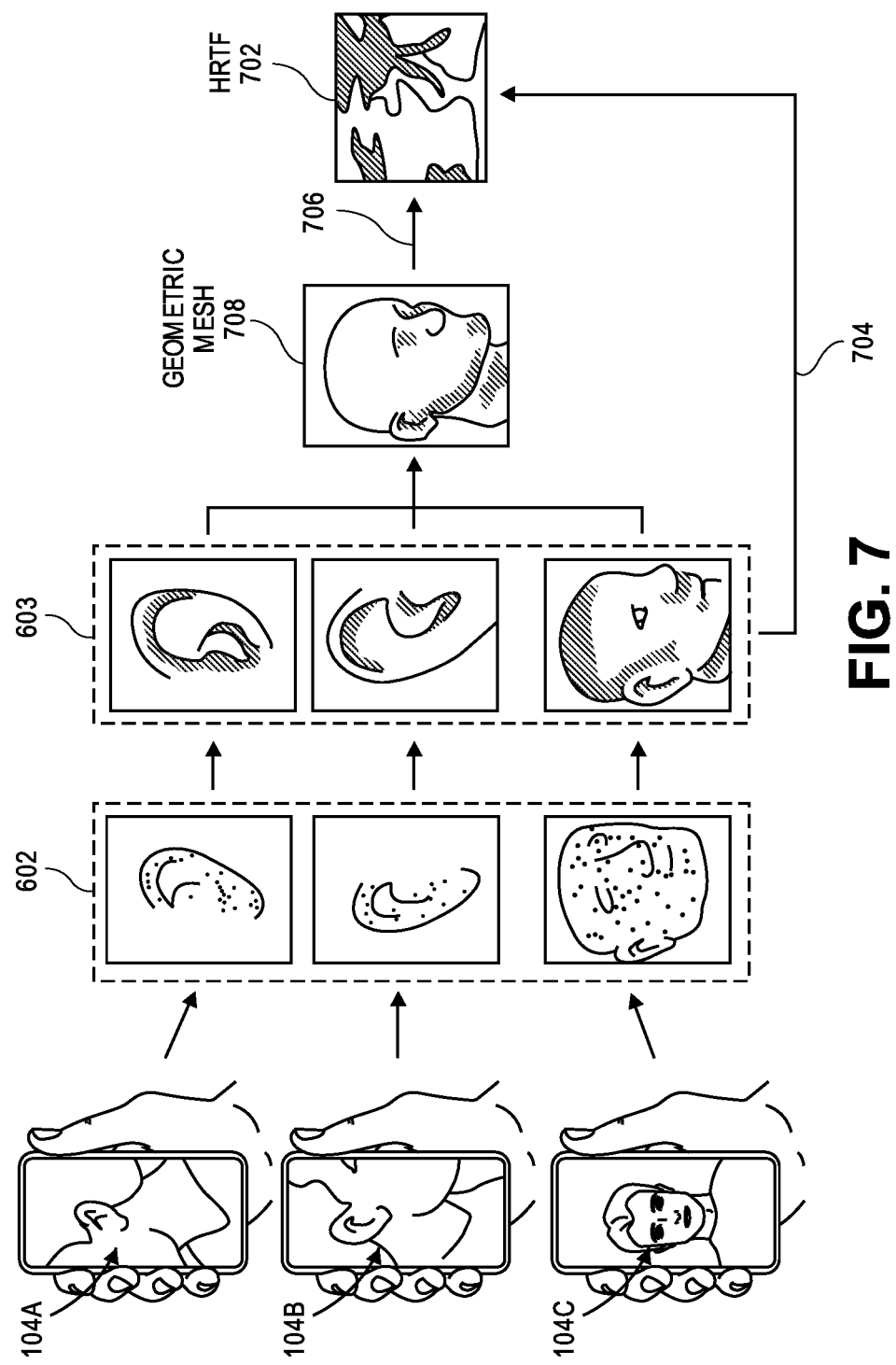
FIG. 7 is a pictorial view of operations of a method of determining a user-specific HRTF, in accordance with an aspect.

Referring to FIG. 7, a pictorial view of operations of a method of determining a user-specific HRTF is shown in accordance with an aspect. The operations include capturing images, e.g., left image 104A, right image 104B, and/or front image 104C, and generating respective data sets 602 from the captured images. The respective data sets 602 can include data sets describing a left pinna, a right pinna, a torso, and a head of user 100. Similarly, data sets 602 can be used, along with statistical methods to correlate features in the data set to other features measured for other users, to generate respective geometric models 603. The respective geometric models 603 can include geometric models describing the left pinna, the right pinna, the torso, and the head of user 100.

At operation 310, device processor(s) 202 determine an HRTF 702 specific to user 100 based on one or more of the geometric models 603 of user anatomy, e.g., geometric model 603 of pinna 110. Determining HRTF 702 can progress along at least one of two paths: an inference path 704, or a numerical model path 706.

In inference path 704, each of the geometric models 603 representing respective anatomical portions, e.g., the left ear, the right ear, or the head, are input to a subjective inference engine. The subjective inference engine can receive inputs from a database of anthropometrics and/or subjective test results. More particularly, the subjective inference engine can include data sets of anthropometric features that correspond to HRTF results measured in a laboratory for other users. The subjective inference engine can receive one or more of the geometric features of geometric model 603 as an input to derive HRTF 702. By way of example, geometric model 603 of pinna 110 can be used by subjective inference engine to find a matching pinna shape in the database of anthropometrics. The matching pinna shape can correspond to an HRTF in the subjective test results. Accordingly, the HRTF can be chosen as a user-specific HRTF for user 100.

In numerical model path 706, the geometric models 603 of user 100 can be combined to generate a geometric mesh 708. More particularly, the submeshes of each geometric model 603 can be stitched together to provide an overall combined mesh that represents an overall shape of the head and ears of user 100. In an aspect, geometric mesh 708 can be input to a numerical model. For example, a finite element model or a boundary element model of the head of user 100 can be used to model an impulse response of the head when an input sound is directed toward the user. The numerical model can output a user-specific HRTF 702. More particularly, the modeled HRTF can be specific to user 100 because it is based on geometric models 603 that accurately represent the actual and expected values of pinna and head features.

In an aspect, the user-specific HRTF 702 can be improved over time. Improvement of HRTF 702 can occur as a result of additional information about anatomical features. For example, an image 104 of pinna 110 can be captured in which certain anatomical features, e.g., a height of triangular fossa 504, is not visible. The hidden feature 502 can be estimated using the processes described above to generate geometric model 603 and/or HRTF 702. Additional images 104 may be captured later, e.g., each time user 100 puts device 102 to his ear to answer an incoming phone call, and one or more of the additional images 104 may capture the fossa height. Accordingly, the previously hidden feature 502 may be visible in the additional images 104, and can be directly measured in the images 104. As time goes on, more and more features can be directly measured to fill in the blanks that exist in data sets 602. As geometric models 603 include more first geometric (known) data, an accuracy of HRTF selection or numerical modeling can improve to generate a more useful user-specific HRTF 702.

Figure 8:
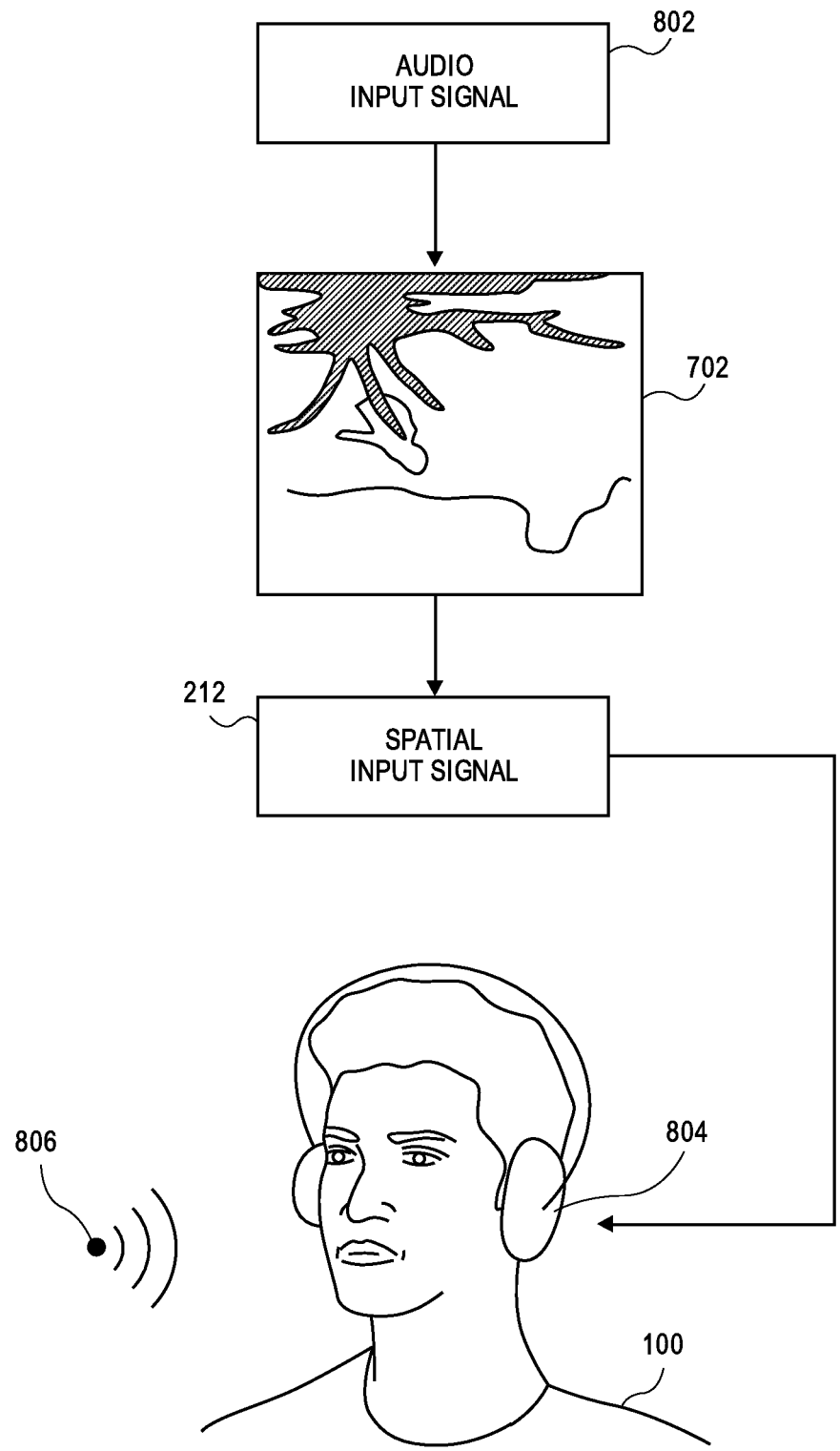
FIG. 8 is a pictorial view of operations of a method of rendering spatial audio to a user based on a user-specific HRTF, in accordance with an aspect.

Referring to FIG. 8, a pictorial view of operations of a method of rendering spatial audio to a user based on a user-specific HRTF is shown in accordance with an aspect. At operation 312, the user-specific HRTF 702 can be applied to an audio signal to generate a spatial input signal 212 specific to user 100. HRTF 702 as selected or generated can include information about a change in amplitude of an input signal at different frequencies and angles relative to user 100.

In an aspect, an audio input signal 802 is received by device processor(s) 202. Audio input signal 802 can be, for example, a recording of a voice. A spatial input signal 212 can be generated by applying HRTF 702 to audio input signal 802. More particularly, spatial input signal 212 is audio input signal 802 filtered by HRTF 702 such that an input sound recording is virtually changed by the diffraction and reflection properties of an anatomy of user 100.

Spatial input signal 212 can be communicated by device processor(s) 202 to an earphone. For example, user 100 can wear headphones having a speaker 804 that directs sound toward pinna 110. At operation 314, processor(s) (of device 200 or the headphones) can drive the speaker 804 with spatial input signal 212 to render a spatialized sound to user 100. The spatialized sound can simulate a sound, e.g., the voice, generated by a spatial sound source 806, e.g., a speaking person, in a virtual environment surrounding user 100. Accordingly, device 102 can accurately render a spatialized audio to user 100 using the user-specific HRTF 702 generated as described above.

As described above, one aspect of the present technology is the gathering and use of data available from various sources to generate a user-specific HRTF. The present disclosure contemplates that in some instances, this gathered data may include personal information data that uniquely identifies or can be used to contact or locate a specific person. Such personal information data can include demographic data, location-based data, telephone numbers, email addresses, TWITTER ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to generate a user-specific HRTF. Accordingly, use of such personal information data enables users to have an improved spatial audio listening experience. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of spatial audio rendering, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an HRTF can be selected and delivered to users by inferring preferences based on non-personal information data or a bare minimum amount of personal information, such as the content being requested by the device associated with a user, other non-personal information available to the device processors, or publicly available information.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

In the foregoing specification, the invention has been described with reference to specific exemplary aspects thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
    receiving, by one or more processors, an image of a pinna of a user, wherein the image includes visible anatomical features of the pinna, and wherein the pinna includes hidden anatomical features obfuscated by the visible anatomical features in the image;
    determining, by the one or more processors, first geometric data representing the visible anatomical features based on the image;
    determining, by the one or more processors, second geometric data representing the hidden anatomical features based on the first geometric data;
    generating, by the one or more processors, a geometric model representing a shape of the pinna based on a combination of the first geometric data representing the visible anatomical features of the pinna and the second geometric data representing the hidden anatomical features of the pinna; and
    determining, by the one or more processors, a head-related transfer function (HRTF) specific to the user based on the geometric model of the pinna of the user.

2. The method of claim 1 further comprising:
    projecting, by a projector of a structured-light scanner, an infrared light pattern onto the pinna; and
    capturing, by a camera of the structured-light scanner, the image of the pinna, wherein the image includes the infrared light pattern on the pinna, and wherein the image is received by the one or more processors to determine the first geometric data.

3. The method of claim 2, wherein the structured-light scanner is pre-calibrated such that the first geometric data includes measurements of the infrared light pattern taken directly from the image without reference to a measurement standard.

4. The method of claim 1, wherein determining the first geometric data includes generating a data set of the visible anatomical features.

5. The method of claim 1, wherein determining the second geometric data includes estimating expected values of the hidden anatomical features based on the determined first geometric data.

6. The method of claim 5, wherein estimating the expected values of the hidden anatomical features includes determining conditional means of the hidden anatomical features based on reference data representing anatomical features of a plurality of reference pinnas.

7. The method of claim 6, wherein the reference data includes measurements of the visible anatomical features and the hidden anatomical features of each of the plurality of reference pinnas.

8. The method of claim 1, wherein generating the geometric model includes combining the first geometric data and the second geometric data in a latent variable model.

9. The method of claim 1 further comprising:
    applying, by the one or more processors, the HRTF to an audio input signal to generate a spatial input signal specific to the user; and
    driving, by the one or more processors, a speaker with the spatial input signal to render a spatialized sound.

10. A device, comprising:
    a memory configured to store an image of a pinna of a user, wherein the image includes visible anatomical features of the pinna, and wherein the pinna includes hidden anatomical features obfuscated by the visible anatomical features in the image; and
    one or more processors configured to:
        receive the image,
        determine first geometric data representing the visible anatomical features based on the image,
        determine second geometric data representing the hidden anatomical features based on the first geometric data,
        generate a geometric model representing a shape of the pinna based on a combination of the first geometric data representing the visible anatomical features of the pinna and the second geometric data representing the hidden anatomical features of the pinna, and
        determine a head-related transfer function (HRTF) specific to the user based on the geometric model of the pinna of the user.

11. The device of claim 10 further comprising a structured-light scanner including a projector configured to project an infrared light pattern onto the pinna, and a camera configured to capture the image of the pinna, wherein the image includes the infrared light pattern on the pinna, and wherein the image is received by the one or more processors to determine the first geometric data.

12. The device of claim 11, wherein the structured-light scanner is pre-calibrated such that the first geometric data includes measurements of the infrared light pattern taken directly from the image without reference to a measurement standard.

13. The device of claim 10, wherein the one or more processors are configured to generate a data set of the visible anatomical features, and to determine the first geometric data based on the data set.

14. The device of claim 10, wherein the one or more processors are configured to estimate expected values of the hidden anatomical features based on the determined first geometric data, and to determine the second geometric data based on the estimated expected values.

15. The device of claim 10 further comprising a speaker, wherein the one or more processors are further configured to
    apply the HRTF to an audio input signal to generate a spatial input signal specific to the user, and
    drive the speaker with the spatial input signal to render a spatialized sound.

16. A non-transitory machine readable medium storing instructions executable by one or more processors of a device to cause the device to perform a method comprising:
    receiving an image of a pinna of a user, wherein the image includes visible anatomical features of the pinna, and wherein the pinna includes hidden anatomical features obfuscated by the visible anatomical features in the image;
    determining first geometric data representing the visible anatomical features based on the image;

determining second geometric data representing the hidden anatomical features based on the first geometric data;

generating a geometric model representing a shape of the pinna based on a combination of the first geometric data representing the visible anatomical features of the pinna and the second geometric data representing the hidden anatomical features of the pinna; and determining a head-related transfer function (HRTF) specific to the user based on the geometric model of the pinna of the user.

17. The non-transitory machine readable medium of claim 16, the method further comprising:

projecting an infrared light pattern onto the pinna; and capturing the image of the pinna, wherein the image includes the infrared light pattern on the pinna, and wherein the image is received by the one or more processors to determine the first geometric data.

18. The non-transitory machine readable medium of claim 17, wherein the first geometric data includes measurements of the light pattern taken directly from the image without reference to a measurement standard.

19. The non-transitory machine readable medium of claim 16, wherein determining the first geometric data includes generating a data set of the visible anatomical features, and wherein determining the second geometric data includes estimating expected values of the hidden anatomical features based on the determined first geometric data.

20. The non-transitory machine readable medium of claim 16, the method further comprising:

applying the HRTF to an audio input signal to generate a spatial input signal specific to the user; and driving a speaker with the spatial input signal to render a spatialized sound.

* * * * *